(12) United States Patent
Kitabatake

(10) Patent No.: US 12,197,798 B2
(45) Date of Patent: Jan. 14, 2025

(54) INFORMATION PROCESSING APPARATUS REGISTERS PRINTER DRIVER FOR A SELECTED IMAGE FORMING APPARATUS WITH ADMINISTRATOR AUTHORITY, CONTROL METHOD OF INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hironobu Kitabatake, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/945,477

(22) Filed: Sep. 15, 2022

(65) Prior Publication Data

US 2023/0092853 A1    Mar. 23, 2023

(30) Foreign Application Priority Data

Sep. 22, 2021  (JP) ................................ 2021-154459

(51) Int. Cl.
    *G06F 3/12* (2006.01)
(52) U.S. Cl.
    CPC .......... *G06F 3/1238* (2013.01); *G06F 3/1204* (2013.01); *G06F 3/1222* (2013.01); *G06F 3/123* (2013.01); *G06F 3/1257* (2013.01); *G06F 3/1225* (2013.01)
(58) Field of Classification Search
    None
    See application file for complete search history.

(56) References Cited

U.S. PATENT DOCUMENTS

| | | | | |
|---|---|---|---|---|
| 7,227,657 | B1 * | 6/2007 | Haltmeyer | G06F 3/1285 358/1.15 |
| 2003/0142330 | A1 * | 7/2003 | Arakawa | G06K 15/00 358/1.9 |
| 2005/0060649 | A1 * | 3/2005 | Kimura | G06F 3/126 715/274 |
| 2006/0045595 | A1 | 3/2006 | Hanaoka | |

(Continued)

FOREIGN PATENT DOCUMENTS

| | | |
|---|---|---|
| CN | 112698796 A | 4/2021 |
| JP | 2004090517 A | 3/2004 |

OTHER PUBLICATIONS

Extended European search report issued in European Appln. No. 22195752.5 mailed on Feb. 21, 2023.

*Primary Examiner* — Haris Sabah
(74) *Attorney, Agent, or Firm* — ROSSI, KIMMS & McDOWELL LLP

(57) ABSTRACT

When a printer driver is installed, identification information of a printing apparatus set as an output destination of print data of the printer driver is registered in a print permission list in an administrator access area. The installed printer driver outputs the print data for the printing apparatus when the identification information of the printing apparatus to which the print data of the printer driver is output is registered in the print permission list. The installed printer driver does not output the print data for the printing apparatus when the identification information of the printing apparatus is not registered in the print permission list.

13 Claims, 14 Drawing Sheets

(56) References Cited

U.S. PATENT DOCUMENTS

| | | | |
|---|---|---|---|
| 2007/0143504 A1* | 6/2007 | Yoshida | H04N 1/00962 |
| | | | 710/8 |
| 2009/0161156 A1* | 6/2009 | Morita | G06F 3/1268 |
| | | | 358/1.15 |
| 2010/0037286 A1 | 2/2010 | Cain | |
| 2011/0075176 A1 | 3/2011 | Nishio | |
| 2012/0254898 A1* | 10/2012 | Nakata | G06F 9/4411 |
| | | | 719/327 |
| 2013/0163014 A1 | 6/2013 | Xiao | |
| 2016/0350045 A1* | 12/2016 | Sawada | G06F 3/1288 |
| 2019/0235795 A1* | 8/2019 | Sato | G06F 3/1258 |
| 2020/0241814 A1* | 7/2020 | Kawaguchi | G06F 3/1204 |

* cited by examiner

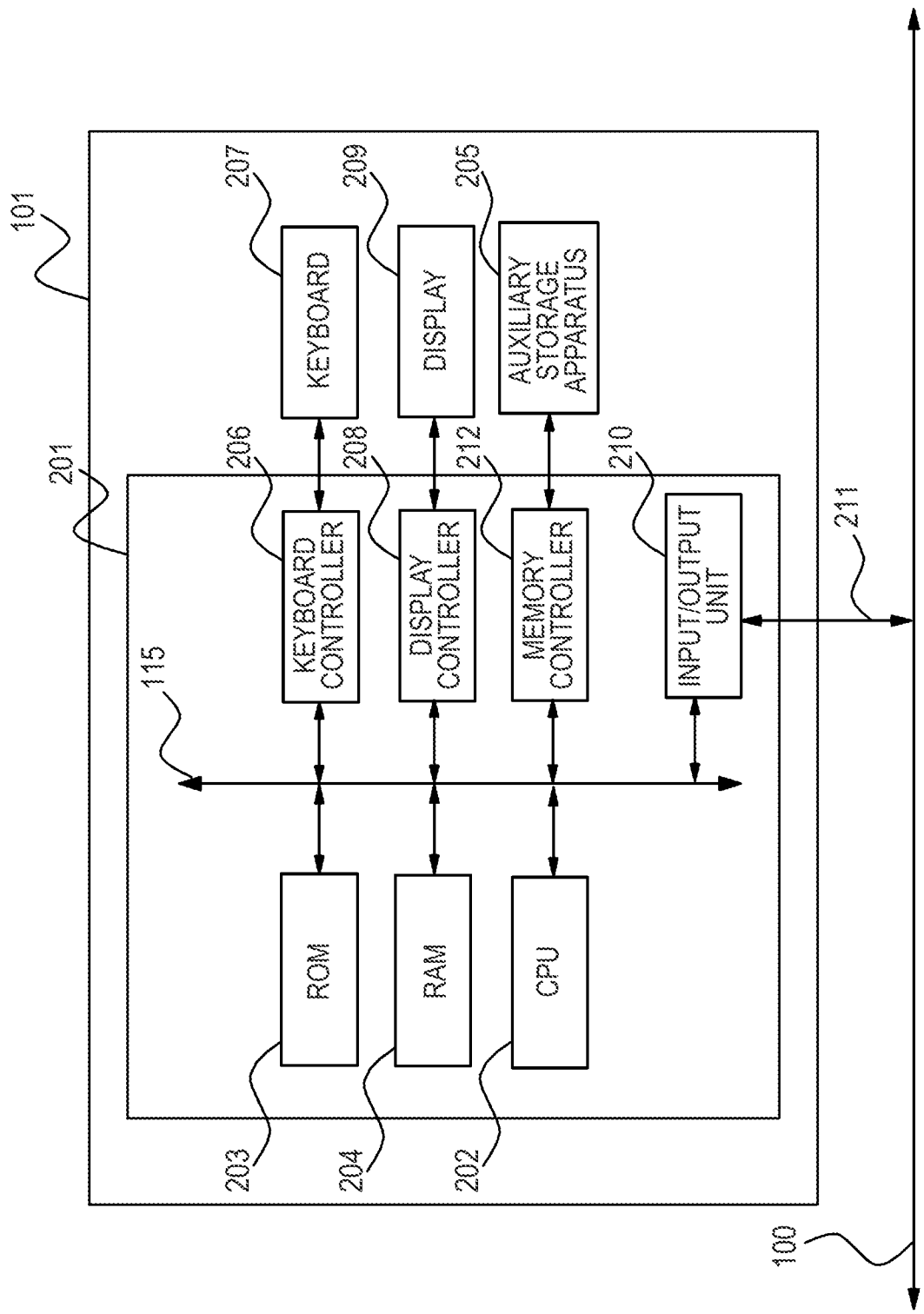

INFORMATION PROCESSING APPARATUS REGISTERS PRINTER DRIVER FOR A SELECTED IMAGE FORMING APPARATUS WITH ADMINISTRATOR AUTHORITY, CONTROL METHOD OF INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a control method of the information processing apparatus and storage medium.

Description of the Related Art

In recent years, there have been an increasing number of cases in which a user brings a company's personal computer (PC) into his/her home or shared office for his/her work. In such a situation, if a print data is printed using a printer apparatus installed in the home or the shared office via the company's PC, confidential documents could be leaked. Therefore, there is a demand from the administrator that documents stored in the company's PC should be printed only on the printer apparatus in the internal office.

In such a case, based on the viewpoint of security, the administrator restricts the installation of the driver by the administrator authority so that the user does not install the application software or the printer driver on the PC to print the documents without permission. In some cases, an operation is performed in which the administrator authority of the operating system (OS) is not given to the general user.

In such an operation in which the administrator authority is not given to the user, the administrator installs a corresponding printer driver on the PC in advance so that printing can be performed by the PC in the company. The use of the installer of the printer driver by the general user and the installation of the driver using the function of the OS are restricted by the administrator operation restricting the function of the OS.

The followings are examples of the administrator restricting functions of OS usable by the general user. For example, the administrator can restrict the installation of a driver automatically performed via a server on the Internet, restrict the installation of a tool configured to perform printing by transmitting a document directly to a printing apparatus, or stop an operation of a UI for registering a new printing apparatus in an OS.

On the other hand, there is a printing apparatus that does not allow a user to perform printing. For example, Japanese Patent Application Laid-Open No. 2004-90517 discloses a printing apparatus requiring a user to input information of permission for using the printing apparatus on the printing apparatus side and prohibiting printing operation on the basis of the information.

However, even in the printing apparatus which prohibits the printing operation as disclosed in Japanese Patent Application Laid-Open No. 2004-90517, if the user purchases and uses a printing apparatus, the user can set the information of permission for using the printing apparatus so that the user can print documents at home via a company's PC. Also, even in the case of a shared office, the company's PC can be connected to the printing apparatus giving the company's PC a permission for use to perform printing.

In addition, even the user who does not have the administrator authority may create a printer queue by using the printer driver preinstalled in the PC for use in the office and by using the function of the OS. Such a printer queue can be created, for example, by the USB Plug & Play function.

Here, a specific example of a case where the printer queue is created by the USB Plug & Play function will be described. The printer queue is created in a case where the printer driver supporting only one type of the printing apparatus is preinstalled in the PC, and where the user without administrator authority prepares the printing apparatus having the same type of printer as the supported type, and connects the prepared printing apparatus to a USB interface. Further, the printer queue is created in a case where the printer driver supporting a plurality of printing apparatuses is preinstalled in the PC, and the user without administrator authority prepares one of the plurality of supported printing apparatuses, and connects the prepared printing apparatus to the USB interface. Thus, the printing apparatus can perform printing by using the created printer queue in the home, the shared office, or the like, thereby the confidential documents can be leaked to the outside.

In order to prevent such a situation from occurring, it is desirable to permit printing by using target printing apparatuses expected to be used when the printer driver is installed, but not to permit printing by using printing apparatuses not expected to be used via the preinstalled printer driver. In addition, there is a problem of leaking confidential information from PCs when performing printing outside the internal office.

SUMMARY OF THE INVENTION

According to an aspect of the present invention, a printer driver controlling an information processing apparatus comprises a control means configured to output a print data for a printing apparatus in a case where predetermined storing area stores information related to the printing apparatus that is a destination of the print data, and not to output the print data for the printing apparatus in a case where the predetermined storing area does not store the information related to the printing apparatus that is the destination of the print data, wherein the predetermined storing area registers the information related to the printing apparatus selected as the destination of the print data when the printer driver is installed in the information processing apparatus.

Further features of the present invention will become apparent from the following description of exemplary embodiments with reference to the attached drawings.

BRIEF DESCRIPTION OF THE DRAWINGS

FIG. 2 illustrates a hardware configuration diagram of a host computer according to the present embodiment.

DESCRIPTION OF THE EMBODIMENTS

Hereinafter, an embodiment of the present invention will be described with reference to the drawings.

First Embodiment

Figure 1A:
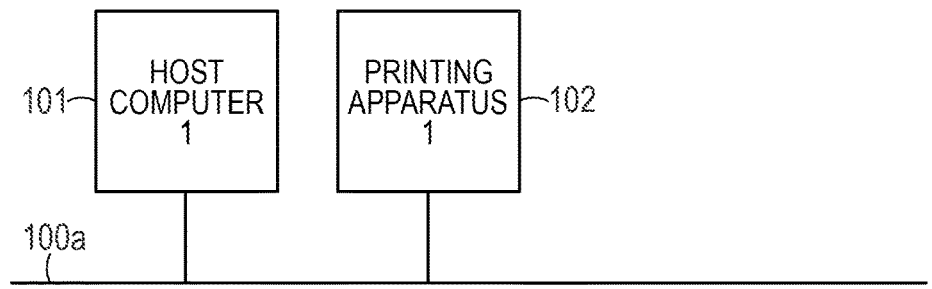
FIG. 1A illustrates an example of a configuration of a system to which the present embodiment can be applied.
Figure 1B:
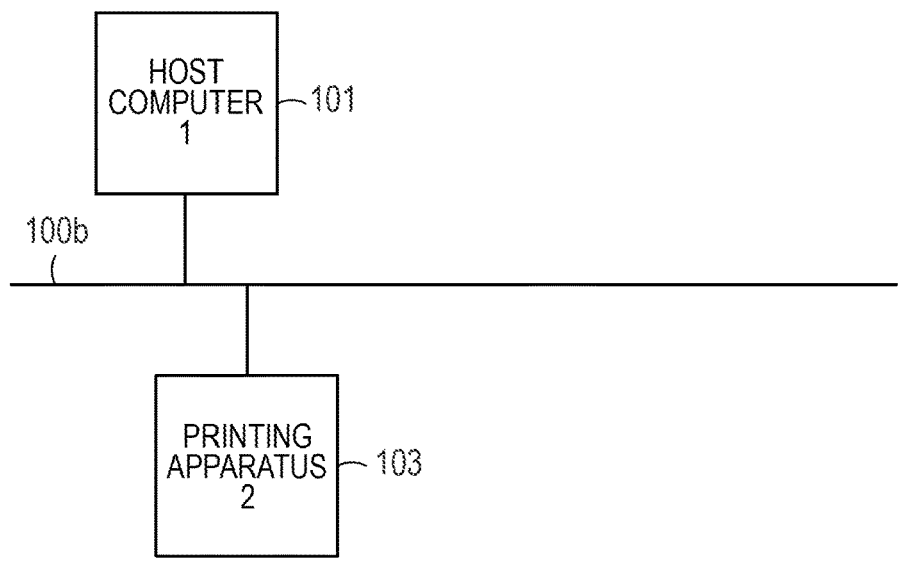
FIG. 1B illustrates an example of a configuration of a system to which the present embodiment can be applied.
Figure 1C:
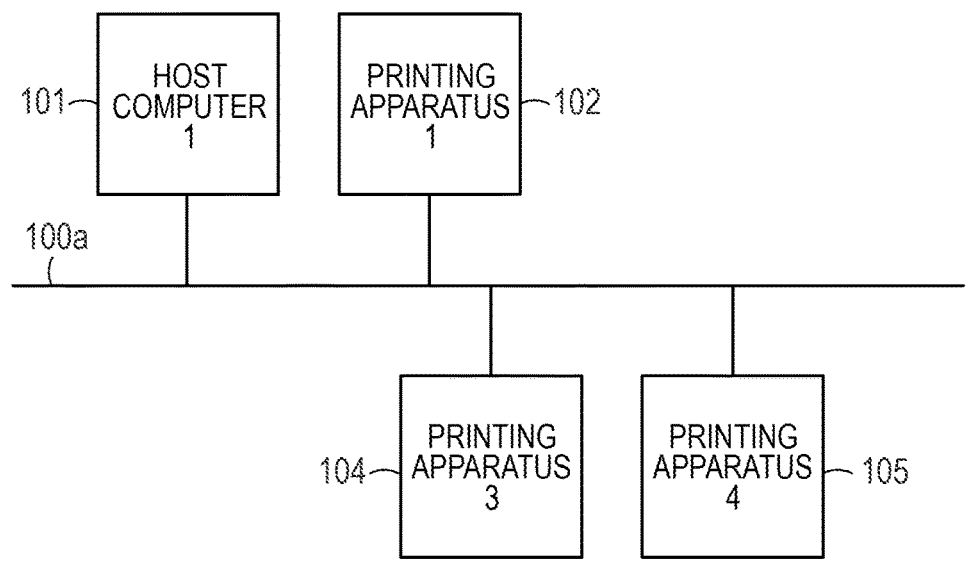
FIG. 1C illustrates an example of a configuration of a system to which the present embodiment can be applied.

FIGS. 1A to 1C are diagrams illustrating examples configuration of a system to which an embodiment of the present invention may be applied. FIG. 1A illustrates an example of a network environment in a company, and a host computer 101 and a printing apparatus 1 (102) are communicatively connected via a network 100a. It is assumed that printing using the printing apparatus 1 (102) is performed from the host computer 101 used by a user via the network 100a.

FIG. 2 illustrates a diagram of an example of the hardware configuration of the host computer 101. The host computer 101 may be a general information processing apparatus such as a personal computer (PC).

In the host computer 101, a control unit 201 is a control part which controls the operation of the host computer 101. In the control unit 201, a CPU 202 controls the entire device according to a program stored in a ROM 203, a RAM 204, or an auxiliary storage apparatus 205. The RAM 204 is also used as a work area when the CPU 202 performs various processes. It should be noted that all the processing of each component in the present embodiment is performed by the CPU 202 executing the program read into the RAM 204 from the auxiliary storage apparatus 205 or the like. An input/output unit 210 controls input/output to/from a network 100 via a communication line 211.

A keyboard controller 206 controls key input from a keyboard 207 or a pointing device (not shown). A display controller 208 controls a screen of a display 209. A memory controller 212 controls access to the auxiliary storage apparatus 205. The auxiliary storage apparatus 205 includes, for example, an HDD (Hard Disk Drive), SSD (Solid State Drive), and the like. Information stored in the auxiliary storage apparatus 205 will be described below.

Figure 3A:
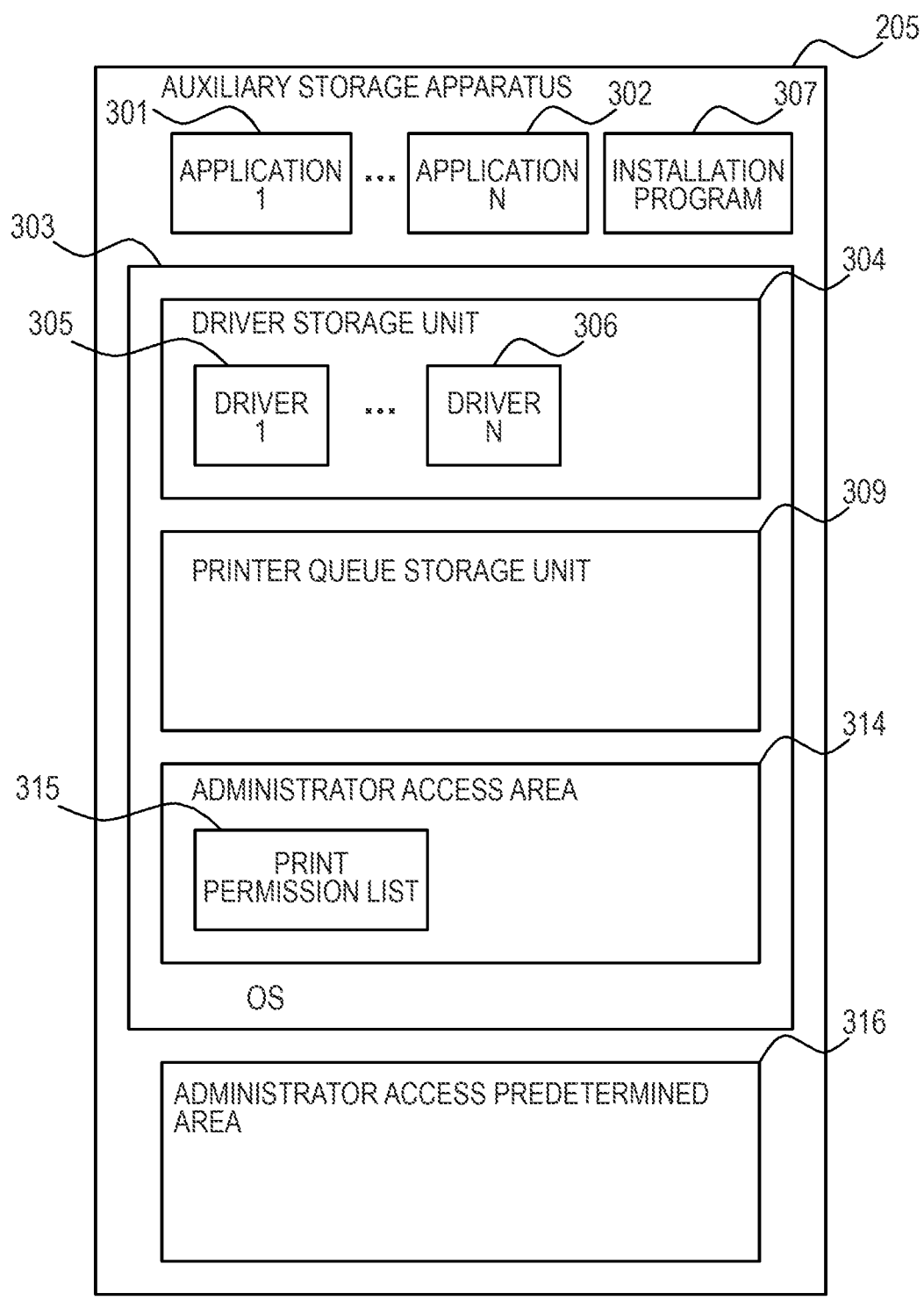
FIG. 3A illustrates information stored in an auxiliary storage apparatus of the host computer in the present embodiment.
Figure 3B:
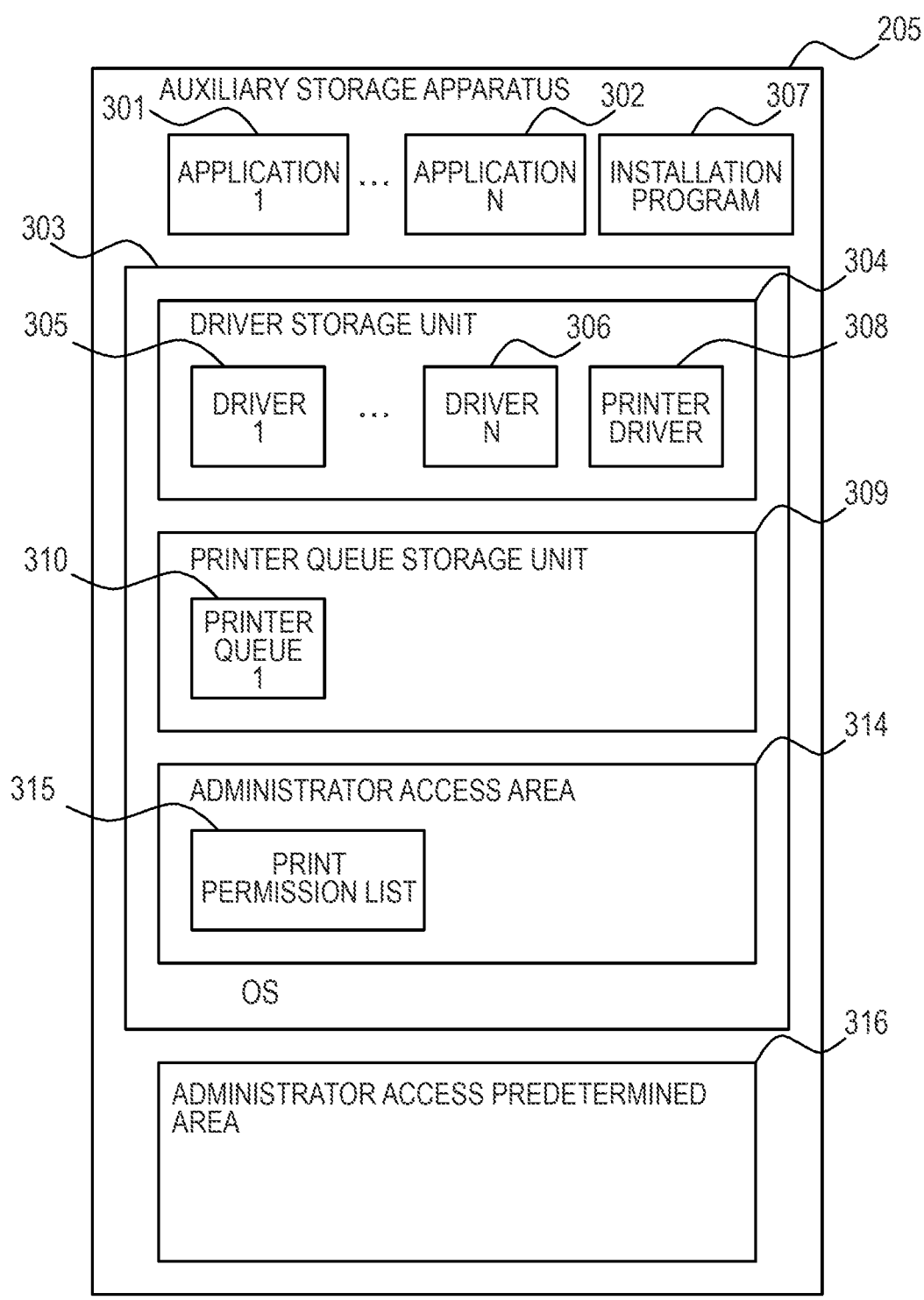
FIG. 3B illustrates information stored in an auxiliary storage apparatus of the host computer in the present embodiment.
Figure 3C:
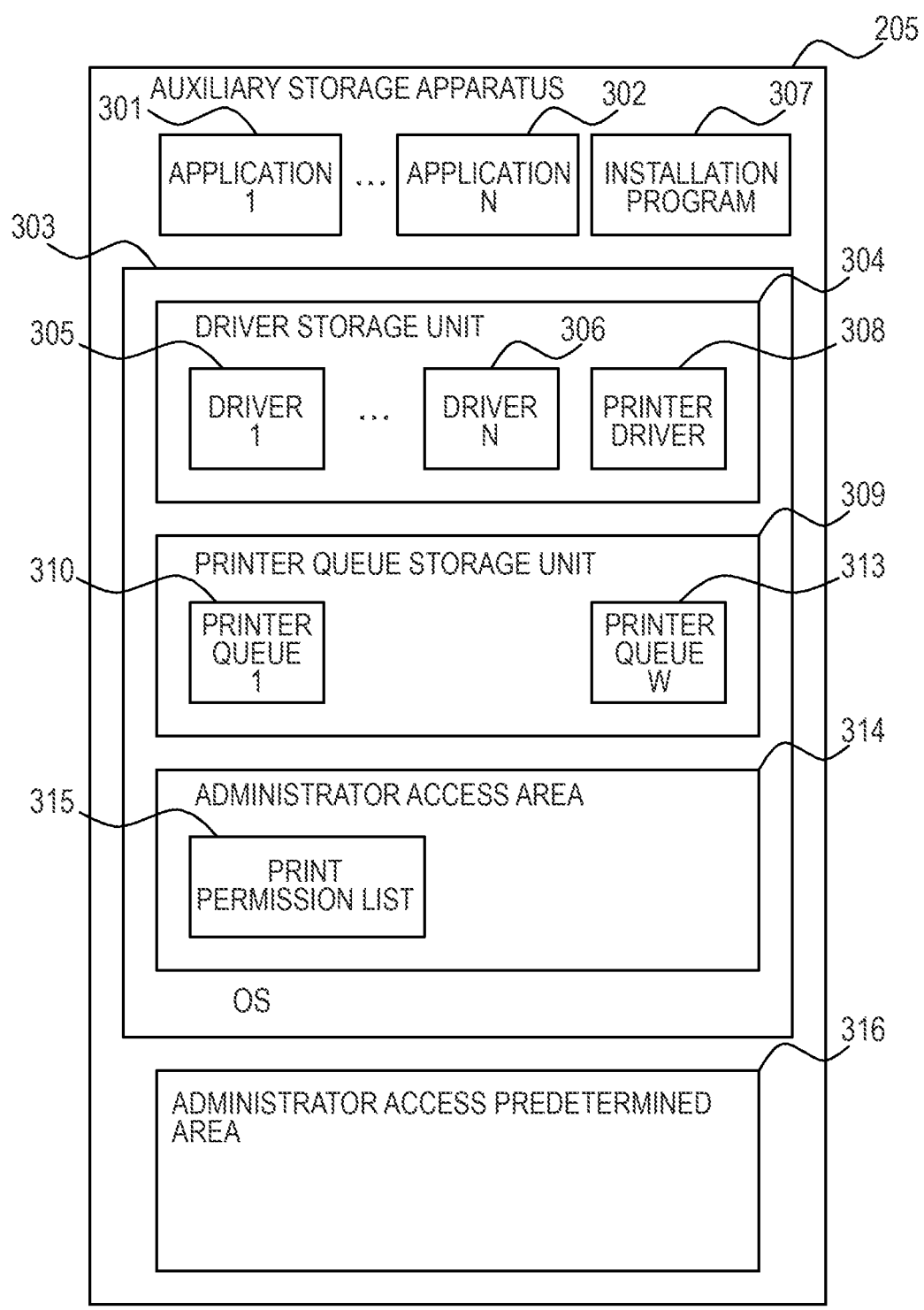
FIG. 3C illustrates information stored in an auxiliary storage apparatus of the host computer in the present embodiment.

FIGS. 3A to 3C illustrate information stored in the auxiliary storage apparatus 205. The auxiliary storage apparatus 205 stores application programs 301, . . . , 302, a printer driver installation program 307, an operating system (hereinafter referred to as "OS") 303, and the like. The OS 303 in the auxiliary storage apparatus 205 has a driver storage unit 304, and stores drivers 305, . . . , 306, and the like of various installed devices. The printer driver, which is one of these drivers, can issue a print instruction to an apparatus having a print function via the input/output unit 210. FIG. 3A illustrates a state of the auxiliary storage apparatus 205 in which the printer driver is not yet installed.

The OS 303 also includes a printer queue storage unit 309. The printer queue storage unit 309 can store a printer queue. The printer queue has driver setting information such as a print state and the number of pages to be printed, temporarily stores a print job, and manages information about a document waiting for printing. FIG. 3A illustrates a state in which the printer queue is not yet registered.

Figure 4:
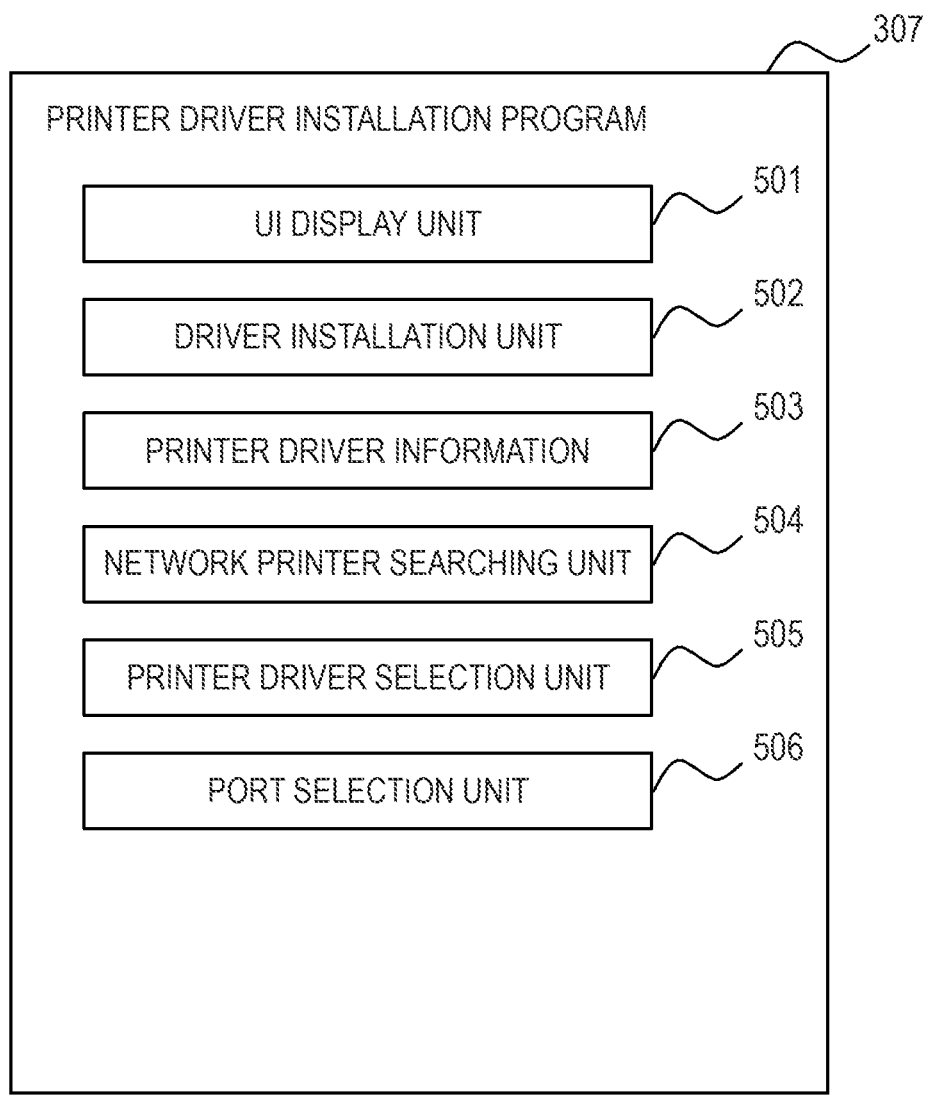
FIG. 4 illustrates a diagram of a configuration of the installer in the present embodiment.

The printer driver installation program 307 will now be described. Hereinafter, the printer driver installation program 307 will be referred to as "installer 307". FIG. 4 illustrates a diagram of an example of the configuration of the installer 307. The installer 307 is read from the auxiliary storage apparatus 205 to the RAM 204 and executed by the CPU 202.

A UI display unit 501 displays a user interface (UI) for installing the printer driver. A driver installation unit 502 appropriately arranges drivers and registers settings in the OS. Printer driver information 503 has all the information of the printer driver to be installed. A network printer searching unit 504 searches for a printer on the network. A printer driver selection unit 505 selects the printer driver to be installed. A port selection unit 506 selects a port to be used for the printer driver to be installed.

Figure 5:
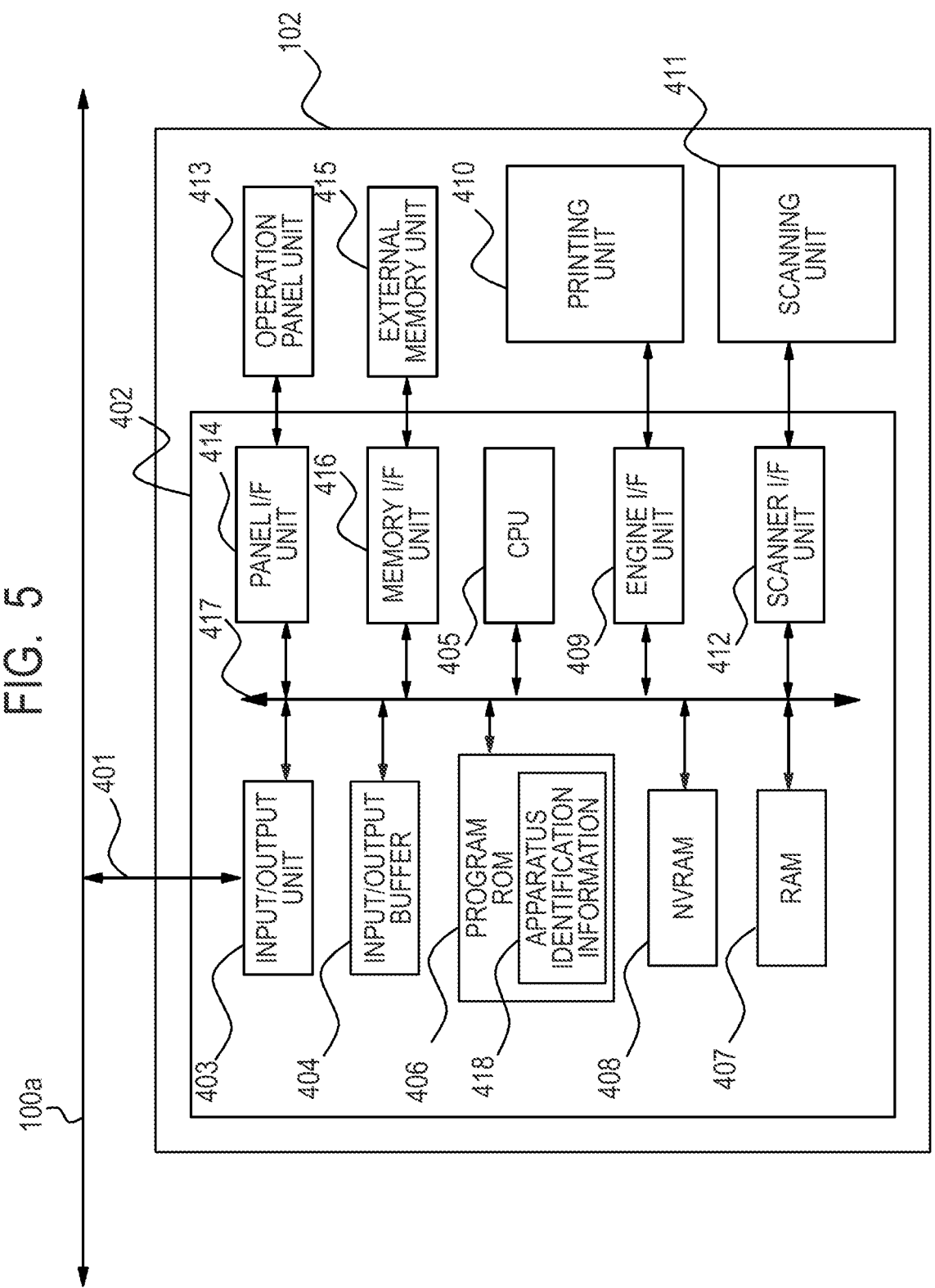
FIG. 5 illustrates a hardware configuration diagram of a multifunction printer as an example of a printer apparatus.

FIG. 5 illustrates a multifunction peripheral (MFP) as an example of the printing apparatus 1 (102). A control unit 402 communicates with each apparatus connected to the network 100a via a communication line 401 connected to the network 100a. The control unit 402 includes an input/output unit 403, an input/output buffer 404, a CPU 405, a program ROM 406, a RAM 407, an NVRAM 408, and a bitmap image rendering unit (not shown). The control unit 402 includes a panel I/F unit 414, a memory I/F unit 416, an engine I/F unit 409, a scanner I/F unit 412, and a system bus 417 connecting each unit.

The input/output unit 403 controls input to and output from the network 100a via the communication line 401. The input/output buffer 404 is used for transmitting and receiving various data including a control code for printing and a print job input from the network 100a and various data in the apparatus. The CPU 405 controls the operation of the entire control unit 402.

The program ROM 406 stores programs and data describing operations of the CPU 405. In addition, the program ROM 406 stores apparatus identification information 418 uniquely assigned to each printing apparatus for identifying the printing apparatuses. The RAM 407 is used as a work memory for, the CPU 405 interpreting and printing a control code and a job, performing calculations necessary for reading an image, and processing input/output image data. The nonvolatile RAM (NVRAM) 408 stores data that needs to be retained even when the power of the apparatus is cut off.

The bitmap image decompressing unit (not shown) decompresses a bitmap of a print job received from a host computer. The engine I/F unit 409 connects the control unit 402 and a printing unit 410. The bitmap data decompressed by the bitmap image decompressing unit (not shown) is transmitted to the printing unit 410 via the engine I/F unit 409 and printed.

The scanner I/F unit 412 connects the control unit 402 and a scanning unit 411. When image data is scanned, a bitmap image or the like read by the scanning unit 411 transmits to the RAM 407 via the scanner I/F unit 412.

The panel I/F unit 414 connects the control unit 402 and the operation panel unit 413. The operation panel unit 413 displays screens for the operation of the entire apparatus, errors, operation guides, and the like. The memory I/F unit 416 connects the control unit 402 to an external memory 415 used for storing print jobs, image data inputted from the outside, various information of the printing apparatus, and the like.

Figure 6:
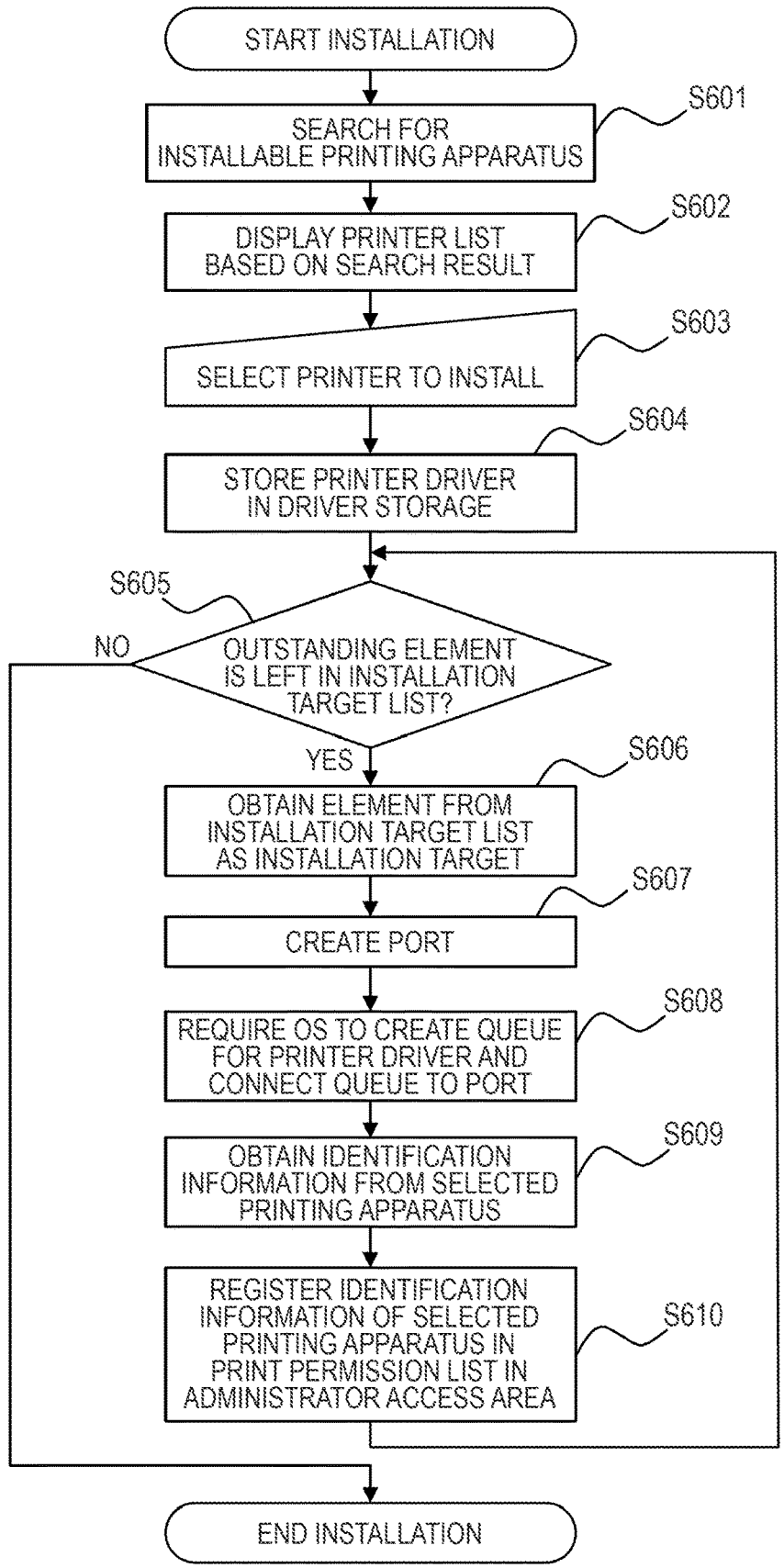
FIG. 6 illustrates a flowchart of the operation of the installer in the first embodiment.

Next, the operation of the installer 307 for installing the printer driver in the present embodiment will be described. FIG. 6 illustrates a flowchart of the operation of the installer 307 of the present embodiment. The process of the flowchart is realized by loading the installer 307 recorded in the auxiliary storage apparatus 205 into the RAM 204 for the CPU 202 that executes the installer 307. Hereinafter, the processing of the installer 307 executed by the CPU 202 will be described, and the installer 307 is considered as an entity that executes the processing. The installer 307 can perform network search installation and custom installation. In the network search installation, the printer driver is installed by searching the network to find a compatible printer. In the custom installation, the printer and the port to be used are set by the user input, and the installation is performed. Here, the network search installation will be described as an example.

When the installation of the printer driver is started, the installer 307 starts the processing of this flowchart. In step S601, the installer 307 performs a multicast inquiry into the network 100a to search for a printer corresponding to the common printer driver 308. For example, Bonjour or WSD (Web Services for Devices) can be used for the search.

In step S602, the installer 307 displays a printer list for selecting a printer to be added based on the response of the search in step S601. In step S603, the installer 307 receives a user operation to select a target printer from the printer list displayed in step S602. For the purpose of explanation, the printing apparatus 1 (102) is assumed to be selected. Hereinafter, the printer driver corresponding to the printing apparatus 1 (102) selected as the installation target is installed.

In step S604, the installer 307 stores the printer driver stored in the installer 307 in the driver storage unit 304 of the OS 303.

Next, in step S605, the installer 307 checks whether any unprocessed elements of the printing apparatus remain in the list to be installed. If unprocessed elements of the printing apparatus remain in the list of installation objects (YES in step S605), the process proceeds to step S606.

In step S606, the installer 307 takes out one unprocessed element of the printing apparatus from the list of installation objects to be installed. Next, in step S607, the installer 307 creates a port according to the port obtained by the search in step S601 corresponding to the printing apparatus to be installed in step S606.

Next, in step S608, the installer 307 requests the OS 303 to create a queue of the printer driver and to associate the created queue with the port created in step S607. In response to this request, the OS 303 creates a printer queue associated with the driver and the port, and registers a new printer queue in the printer queue storage unit 309. As a result, as shown in FIG. 3B, the printer driver 308 corresponding to the printing apparatus 1 (102) is registered in the OS 303, and the printer queue 1 (310) associated with the printing apparatus 1 (102) is registered in the printer queue storage unit 309.

Figure 7A:
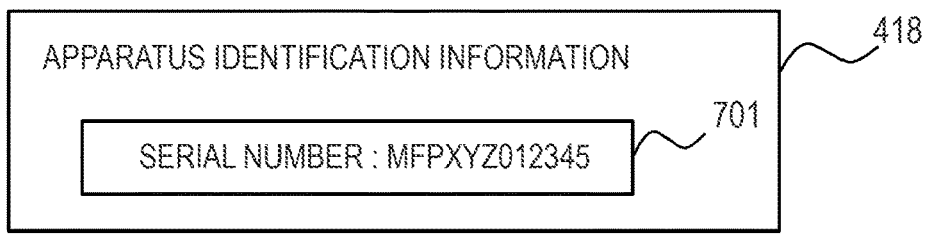
FIG. 7A illustrates apparatus identification information stored in the printer apparatus and a print permission list stored in the host computer.

Next, in step S609, the installer 307 communicates with the printing apparatus (printing apparatus 1 (102) in the above example) to be installed in step S606, and obtains unique identification information of the printing apparatus from the printing apparatus. As the unique identification information of the printing apparatus, information that can be used to identify the individual printing apparatus such as a unique serial number of the apparatus or a MAC address may be included, and other information (for example, an IP address) may be used if the individual apparatus can be identified. The serial number is stored in the printing apparatus 1 (102) as exemplified by the apparatus identification information 418 shown in FIG. 7A. Here, for example, "MFPXYZ012345" (701) is stored as apparatus identification information of the printing apparatus 1 (102). In step S609, the apparatus identification information is obtained by a predetermined command via the network.

Figure 7B:
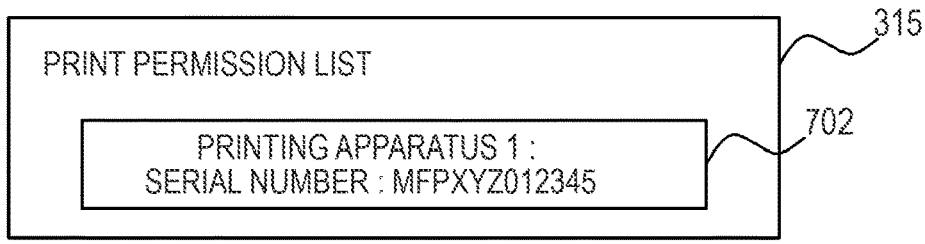
FIG. 7B illustrates apparatus identification information stored in the printer apparatus and the print permission list stored in the host computer.

In step S610, the installer 307 registers the identification information obtained in step S609 in a list (print permission list 315) for giving print permission to the printer driver in an administrator access area 314. In the example of FIG. 7B, the apparatus identification information "MFPXYZ012345" of the printing apparatus 1 (102) is registered in the print permission list 315 together with the name of the printing apparatus as shown in an item 702. The administrator access area 314 is a management area of the OS 303 that can be edited (written) only by a user having the administrator authority of the OS 303 as described above. It should be noted that the print permission list may be stored and managed in an administrator access predetermined area 316, which is a predetermined storage area of the auxiliary storage apparatus 205 to which access restrictions are applied and which can be edited only by a user having the administrator authority.

When the installation of one element is completed in step S610, the installer 307 returns the process to step S605. In step S605, if no unprocessed element of the printing apparatus remains in the list of installation objects (NO in step S605), the installer 307 terminates the printer driver installation process.

In the case of a custom installation, the installer 307 performs a step of receiving user input about the printing apparatus and the port to be used instead of the steps S601 to S603, and performs the processes of steps S606 to S610 based on the user input.

FIG. 6 illustrates an example of acquiring identification information such as a serial number from the printer in step S609. For example, the administrator performing the installation may input identification information such as a serial number attached to the machine body of the printing apparatus via a keyboard or the like.

As described above, in the company, the administrator can register the printing apparatus 1 (102) of the company in the print permission list 315 by using the installer. For example, as shown in the item 702 of FIG. 7B, the apparatus identification information "MFPXYZ012345" of the printing apparatus 1 (102) is registered together with the name of the printing apparatus in the print permission list 315 of the administrator access area 314 in the auxiliary storage apparatus 205 of the host computer 101. The information registered in the print permission list 315 may be information based on the identification information of the printing apparatus, information obtained by combining identification information such as a serial number with information such as a name or a model name of the printing apparatus, or processed information (for example, a hash value or the like).

Here, as shown in FIG. 1B, it is assumed that the user connects the host computer 101 from in a shared office or the like to a network 100b different from that in the company, and connects the host computer 101 to the printing apparatus 2 (103) on the network 100b. In this case, the OS 303 searches the driver storage unit 304 for the printer driver that can be used by the connected printing apparatus. If there is an available printer driver, the OS 303 creates a port as performed by the installer in FIG. 6, links the printer driver with the port, creates a printer queue, and creates a new printer queue in the printer queue storage unit 309. For example, as shown in FIG. 3C, the printer queue W 313 connected to the printer driver 308 is registered in the printer queue storage unit 309. However, in this case, since the installer 307 is not used, the identification information of the printing apparatus connected to the new printer queue W 313 is not registered in the print permission list 315.

Figure 7C:
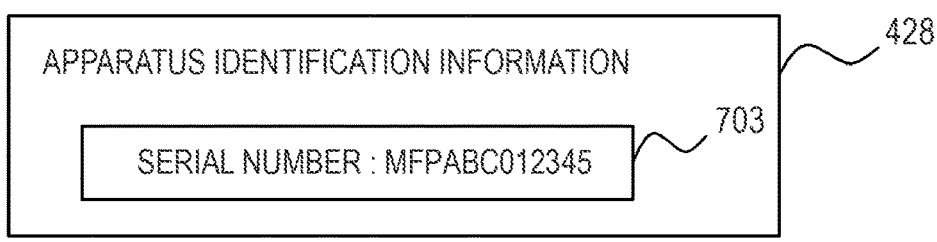
FIG. 7C illustrates apparatus identification information stored in the printer apparatus and the print permission list stored in the host computer.

Like the printing apparatus 1 (102), the printing apparatus 2 (103), has the same apparatus identification information 428 as the apparatus identification information 418, and stores the serial number "MFPABC012345" (703) as shown in FIG. 7C.

Figure 8:
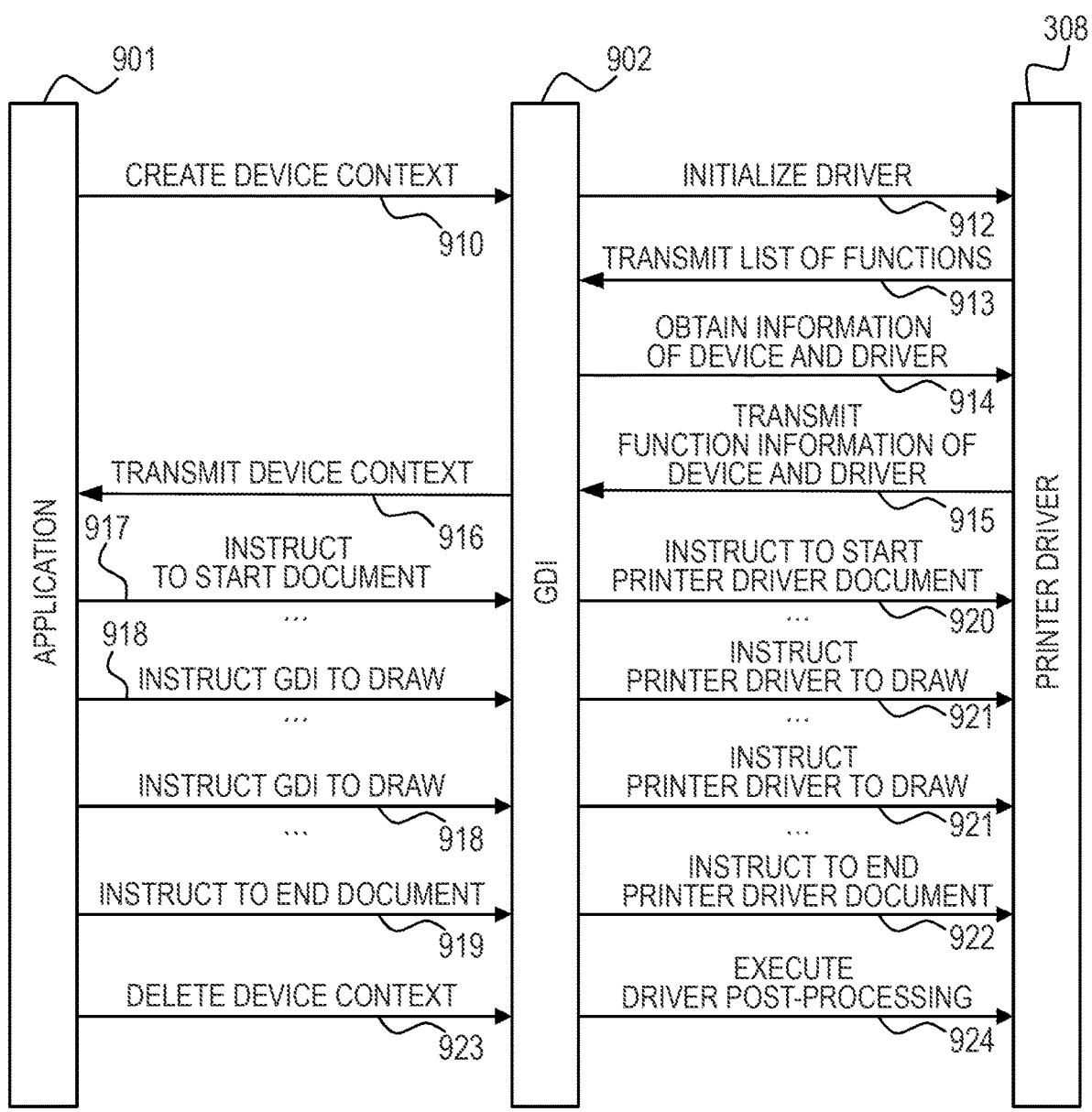
FIG. 8 illustrates a sequence diagram of the interaction of the application, GDI, and printer driver.

Next, the print processing of the printer driver 308 will be described. FIG. 8 illustrates a sequence diagram of communications between an application 901, a print-related instruction group GDI (Graphics Device Interface) 902 that is used by the application giving instructions to the OS according to documents to be printed, and the printer driver 308. The application 901 is, for example, an application 1 (301).

The GDI 902 is an interface for executing rendering-related processing provided as a part of the OS 303. The GDI 902 manages the device context, which is a virtualized drawing area, and generates data for display or printing associated with drawing from an application to the device context.

When printing starts, application 901 instructs GDI 902 to create a device context (910). Then, a driver initialization process is called from the GDI 902 to the printer driver 308 (912), and the printer driver 308 returns a list of corresponding functions (913).

The GDI 902 instructs the printer driver 308 to obtain information on the printing apparatus and the driver (914), and the printer driver 308 returns information on the functions of the printing apparatus and the printer driver to the GDI 902 (915).

The GDI 902 returns the created device context to the application 901 (916). The application 901 uses this device context to instruct the OS 303 to start a print process based on a document, to draw a GDI (which collectively indicates various drawing instructions), to end the print process base on a document, and so on.

The application 901 instructs the OS 303 to start the print process based on a document (917). In response to the instruction, the GDI 902 instructs the printer driver 308 to start a print process by the printer driver (920). The application 901 instructs the GDI 902 to execute a GDI drawing instruction (which collectively indicates various drawing instructions) (918). In response to the instruction, the GDI 902 instructs the printer driver 308 to issue a drawing instruction (this generically indicates the drawing instruction to each printer driver for the drawing instruction specified to GDI from various applications) for the printer driver (921). The application 901 instructs the GDI 902 to end of the print process based on the document (919). In response to the instruction, the GDI 902 instructs the printer driver 308 to end of the print process by the printer driver (922).

Then, the application 901 finishes printing and instructs the GDI 902 to delete the device context (923). In response to this instruction, the GDI 902 instructs the printer driver to perform driver post-processing (924), and the printing process ends.

Figure 9:
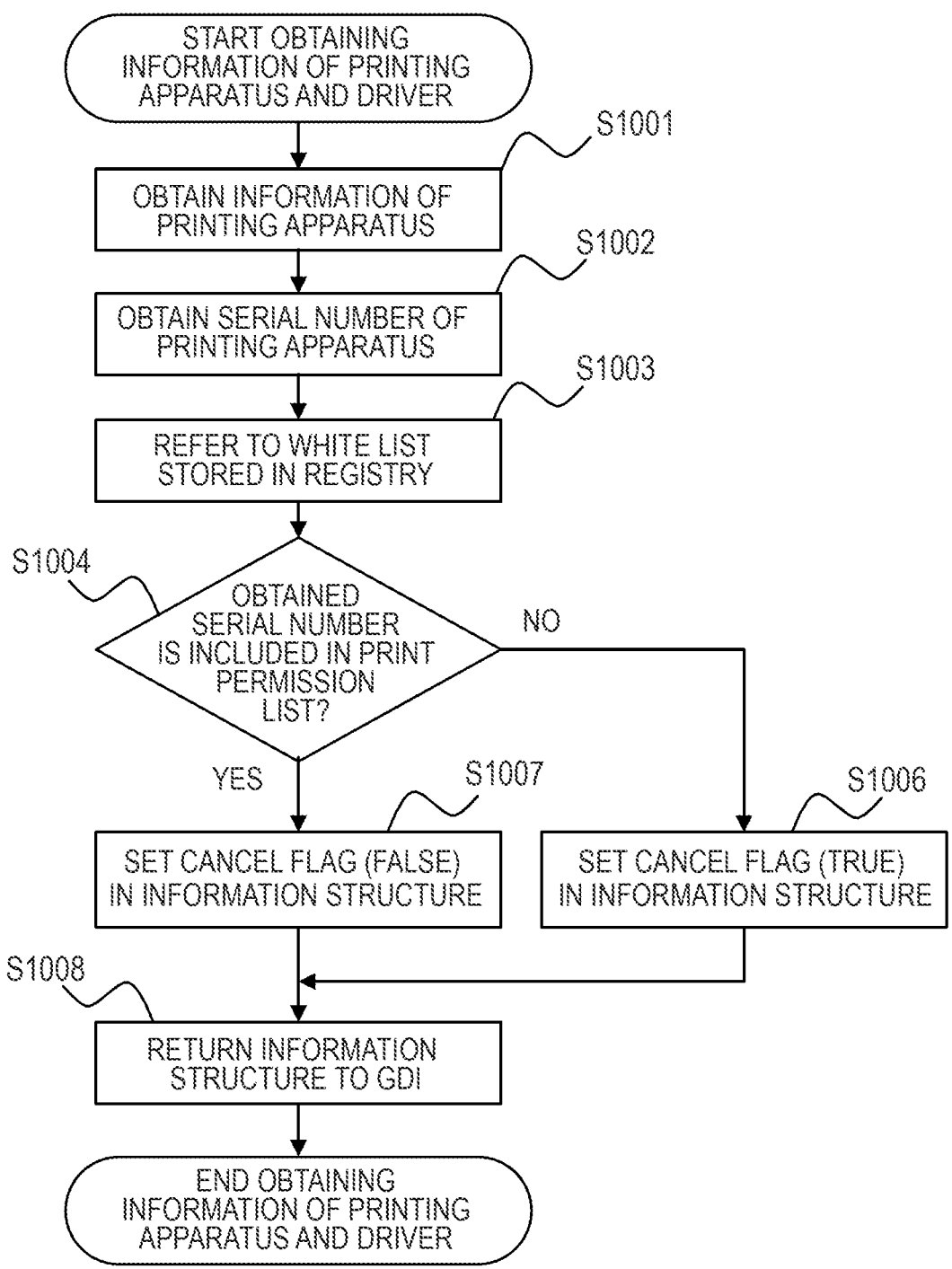
FIG. 9 illustrates a flowchart of information acquisition processing of the printer apparatus and driver by the printer driver according to the present embodiment.

The processing by the printer driver 308 will now be described. FIG. 9 illustrates a flowchart of an example of processing executed by the printer driver 308 for obtaining information of the printing apparatus and printer driver of the present embodiment. The processing of this flowchart is realized by loading the printer driver 308 stored in the auxiliary storage apparatus 205 into the RAM 204 and executing the printer driver 308 by the CPU 202. Hereinafter, the processing of the printer driver 308 executed by the CPU 202 will be described, and the printer driver 308 is considered as an entity that execute the processing. If the obtaining of information about the printing apparatus and the printer driver is called from the GDI 902 (process 914 in FIG. 8), the printer driver 308 starts to obtain information about the printing apparatus and the printer driver shown in FIG. 9.

First, in step S1001, the printer driver 308 communicates with a printing apparatus to be printed, and obtains information of the printing apparatus from the printing apparatus. Thereafter, the printer driver 308 obtains unique identification information (described here as a serial number) of the printing apparatus to be printed (step S1002).

In step S1003, the printer driver 308 refers to the print permission list 315 in the administrator access area 314 (e.g., registry) (step S1003). The print permission list 315 is a list for giving print permission to a printer driver in the administrator access area 314, which is a management area of the OS 303 that can be edited only by a user having the administrator authority registered by the installer 307 in step S610 of FIG. 6.

Next, in step S1004, the printer driver 308 checks whether or not the serial number obtained in step S1002 is included in the print permission list 315. If the serial number is not included in the print permission list 315 (NO in step S1004), the printer driver 308 advances the process to step S1006. If the identification information cannot be obtained in step S1002, the printer driver 308 advances the process to step S1006. In step S1006, the printer driver 308 sets "TRUE" to a cancel flag for skipping printing in order to prohibit printing on the printing apparatus that is not permitted to perform printing, and advances the process to step S1008.

On the other hand, if the serial number is included in the print permission list 315 (YES in step S1004), the printer driver 308 advances the process to step S1007. In step S1007, the printer driver 308 sets "FALSE" to the cancel flag for skipping printing in order to permit printing on the printing apparatus that permits printing, and advances the process to step S1008.

In step S1008, when the printer driver 308 transmits the function information of the printing apparatus and printer driver to the GDI 902 in process 915 of FIG. 8, the printer driver 308 defines and sets the cancel flag in an information structure that returns the function information of the printing apparatus and printer driver to the GDI 902 to return the information structure to the OS 303. As the information structure, for example, a DEVMODE structure may be used in Windows®. After the processing in step S1008, the printer driver 308 terminates the processing of this flowchart.

When performing printing on the printing apparatus 1 (102) in the internal network 100a, the serial number "MFPXYZ012345", for example, can be obtained as the apparatus identification information and is listed in the print permission list 315 as shown in FIG. 7B. Therefore, in this case, "FALSE" is set as the cancel flag in the process of FIG. 9. On the other hand, when performing printing on the printing apparatus 2 (103) in the shared office network 100b, the serial number "MFPABC012345" can be obtained as the apparatus identification information and is not listed in the print permission list 315 as shown in FIG. 7B. Therefore, in this case, the cancel flag is set to "TRUE" in the process of FIG. 9.

Figure 10:
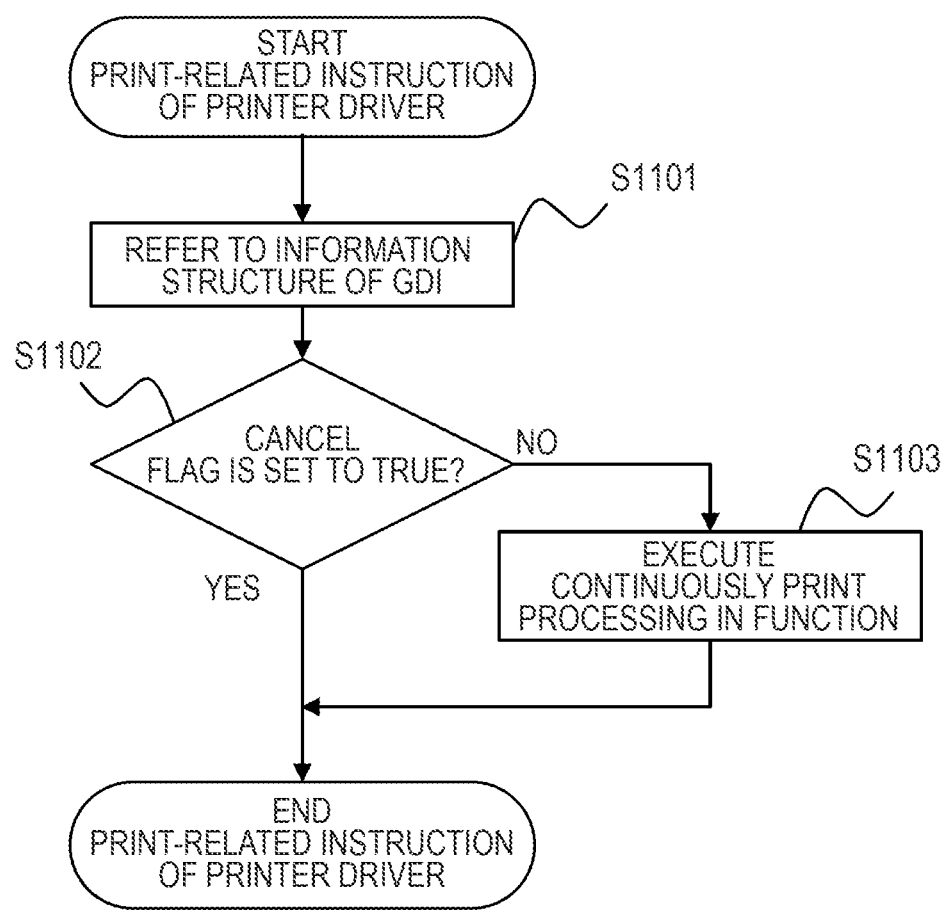
FIG. 10 illustrates a flowchart of a processing of print-related instructions of the printer driver in the present embodiment.

Next, descriptions will be given of a configuration in which the printer driver 308 performs a process and controls printing as shown in FIG. 10 among the print-related instructions from the GDI 902 to the printer driver 308 after the process 920 shown in FIG. 8. FIG. 10 illustrates a flowchart of an example of a processing of printer driver print-related instructions executed by the printer driver 308 of the present embodiment.

When each printer driver print-related instruction from the GDI 902 is started, the printer driver 308 starts the processing of this flowchart. First, in step S1101, the printer driver 308 refers to the information structure of the GDI 902, and refers to the cancel flag set in step S1006 or S1007 shown in FIG. 9.

Next, in step S1102, the printer driver 308 checks whether the cancel flag is set to "TRUE" or not. If the cancel flag is set to "TRUE" (YES in step S1102), the printer driver 308 determines that printing is prohibited, and terminates the printer driver print-related instruction without performing printing in the function that has received the print instruction.

On the other hand, if the cancel flag is not set to "TRUE" (NO in step S1102), the printer driver 308 determines that printing is possible, continues to execute printing in the function that has received the print instruction (step S1103), and ends the printer driver print-related instruction.

In this example, when performing printing on the printing apparatus 1 (102) in the internal network 100a, the printing processing is executed because the cancel flag is set to "FALSE". On the other hand, when performing printing on the printing apparatus 2 (103) in the shared office network 100b, the printing processing in each function is not executed, and printing is not performed because the cancel flag is set to "TRUE".

As described above, the printer driver of the present embodiment calls the print-related instruction of each printer driver, and at the time of installation, determines whether the printing apparatus to be printed is registered in the list for giving the registered print permission (print permission list 315). As a result, it is possible to permit printing only to the printing apparatus used in the company, and not to the printing apparatus in the home or the shared office. Thus, it is possible to prevent leakage of confidential information due to printing in external places performed by a PC taken outside the company.

Second Embodiment

In the first embodiment, the processing when the printer driver is installed by the installer and the operation of the printer driver at the time of printing have been described. In the present embodiment, the operation of the printer driver when the printer driver corresponding to the printing apparatus is installed by the function of the OS will be described.

The present embodiment is different from the first embodiment on the processes between installation of the printer driver 308 via the function of the OS 303, and registration of the printing apparatus in the print permission list 315, but same as the first embodiment regarding the printing process.

The function of the OS 303 can be used to install the printer driver 308 corresponding to the printing apparatus 1 (102). In this case, upon completion of the installation of the printer driver 308 to the OS 303, a function called from the OS 303 if the driver is operated is called as initialization setting when the printer driver is registered. For example, in the case of the Windows OS, when the printer driver is installed in the OS, DrvPrinterEvent function is called by the OS with PRINTER_EVENT_INITIALIZE set as a command argument. The above processing of printer driver registration by the OS can be restricted for a general user (the user without administrator authority) based on a restriction function of the OS (for example, restriction using a group policy). Under such a restriction, the processing shown in FIG. 11 is executed with the administrator authority.

Figure 11:
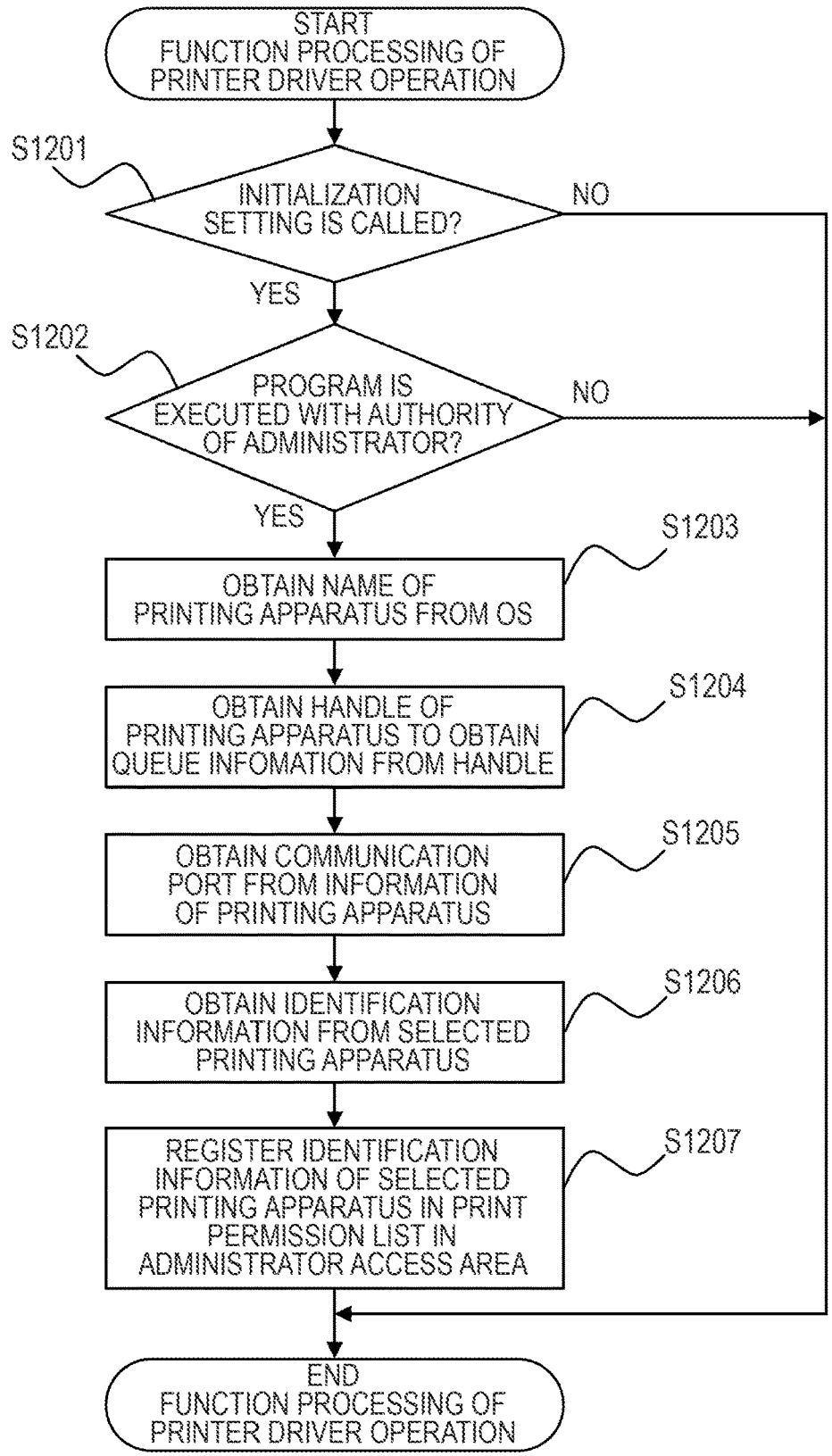
FIG. 11 illustrates a flowchart of processing of a function for printer driver operation by the printer driver in the second embodiment.

FIG. 11 illustrates a flowchart of an example of processing of a function of a printer driver operation by the printer driver 308 of the present embodiment. The processing of the flowchart is realized by loading the printer driver 308 stored in the auxiliary storage apparatus 205 into the RAM 204 and executing the printer driver 308 by the CPU 202. Hereinafter, the processing of the printer driver 308 executed by the CPU 202 will be described, and the printer driver 308 is considered as an entity that executes the processing. First, when a function of printer driver operation is called from the OS 303, the printer driver 308 starts the processing of this flowchart.

First, in step S1201, the printer driver 308 checks whether the call is made in the initialization setting at the time of registration of the driver. The call for the printer driver initialization setting is the call that OS 303 transmits to the printer driver 308 when the installation of the printer driver 308 is completed. The printer driver 308 also receives a call from the OS 303 when the configuration of the print is changed or when an instruction to delete the printer driver is given. However, these calls are different from calls for initialization settings. If the call is not made in the initialization setting (NO in step S1201), the printer driver 308 ends the processing of the function of the printer driver operation.

On the other hand, in the case of the call in the initialization setting (YES in step S1201), the printer driver 308 advances the process to step S1202. In step S1202, the printer driver 308 checks whether or not the program is operated with the administrator authority. If the program corresponding to the printer driver 308 is not operated with the administrator authority (NO in step S1202), the printer driver 308 determines that the printer driver operation function is called by the general user authority, and terminates the processing of the printer driver operation function without registering the identification information of the printing apparatus.

On the other hand, if the program is operated with the administrator authority (YES in step S1202), the printer driver 308 advances the processing to step S1203. In step S1203, the printer driver 308 obtains a printer name from the OS 303. Next, in step S1204, the printer driver 308 obtains the handle of the printer using the printer name obtained in step S1203. Further, the printer driver 308 obtains information on the printer queue from the obtained handle.

Next, in step S1205, the printer driver 308 obtains the communication port from the information structure of the printing apparatus (for example, the PRINTER INFO 2 structure in the case of the Windows OS). Next, in step S1206, the printer driver 308 obtains the unique identification information of the printing apparatus from the printing apparatus 1 (102).

In step S1207, the printer driver 308 registers the identification information obtained in step S1206 in a list (print permission list 315) for giving print permission to the driver in the administrator access area 314, and ends the processing of the function of the printer driver operation. As described above, the administrator access area 314 is a management area of the OS 303 that can be edited only by a user having administrator authority for the OS 303. It should be noted that the print permission list may be stored and managed in the administrator access predetermined area 316, which is a management area of the auxiliary storage apparatus 205 and to which access restrictions are applied so that only a user having the administrator authority can access.

In this manner, the printing apparatus 1 (102) in the company can be registered in the print permission list 315 in the company in the same manner as the registration processing in the print permission list 315 by using the installer 307 of the first embodiment. The print processes of the printer driver 308 after registration is same as the processes in the first embodiment.

As described above, even if the printer driver corresponding to the printer is installed by the function of the OS, the identification information of the printer is registered in the print permission list of the administrator access area when the function of the printer driver operation is called from the OS in the initialization setting at the time of registration of the driver. Thus, it is possible to determine whether a printing apparatus to be used is registered, to permit printing only to a printing apparatus used in the company, and to prevent printing by using a printing apparatus installed in a home or a shared office. As a result, it is possible to prevent leakage of confidential information due to printing in external places via a PC taken outside the company.

Third Embodiment

In the first and second embodiments described above, processing in the case where the printer driver is installed by the installer or the function of the OS, and the operation of the printer driver at the time of printing under such circumstances have been described. In the above operation, if a printing apparatus broke down or the like and a new printing apparatus is installed in an office, it is necessary to delete the broken printing apparatus from the printing permission list and to register the newly installed printing apparatus. Therefore, in the present embodiment, in case where the identification information of the printing apparatus is already registered in the print permission list, a process for replacing the already registered identification information with the identification information of another printing apparatus or for newly adding the identification information of the printing apparatus will be described.

Figure 12:
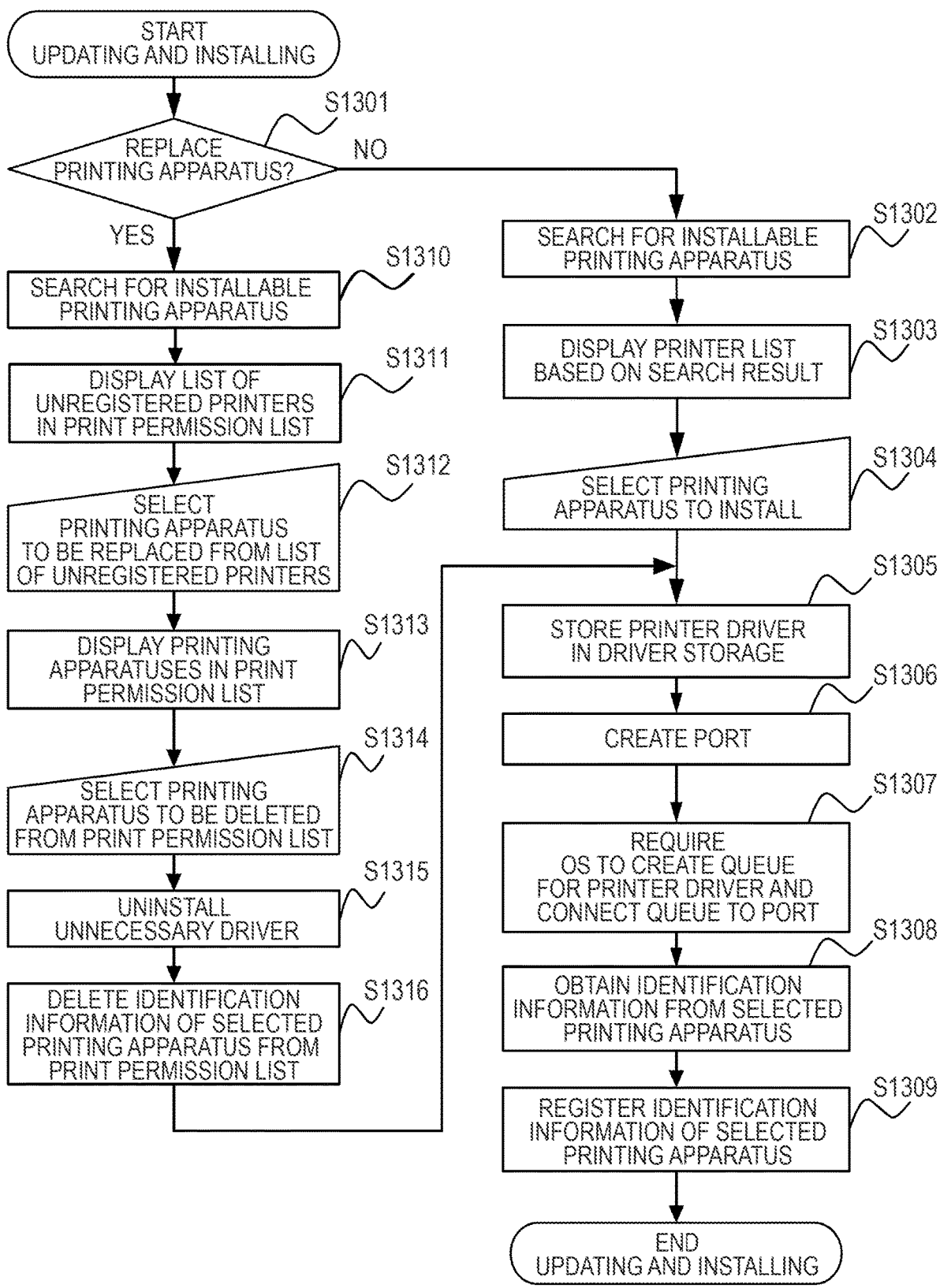
FIG. 12 illustrates a flowchart of the operation of the installer in the third embodiment.

FIG. 12 illustrates a flowchart of the operation of the installer 307 in the third embodiment. The process of the flowchart is realized by loading the installer 307 recorded in the auxiliary storage apparatus 205 into the RAM 204 and executing it by the CPU 202. Hereinafter, the processing of the printer driver 308 executed by the CPU 202 will be described, and the printer driver 308 is considered as an entity that executes the processing. Here, as in FIG. 6, a network search installation will be described as an example.

When the installation of the printer driver is started, the installer 307 starts the processing of this flowchart. In step S1301, the installer 307 checks whether the printing apparatus is to be replaced or not. For example, the installer 307 displays a UI (not shown) to receive a user selection of whether to replace a printing apparatus or to install a printing apparatus from the UI, and determines that the replacement of the printing apparatus is performed if the replacement of the printing apparatus is selected. Further, if even one identification number is registered in the print permission list 315, it may be determined that the replacement of the printing apparatus is performed, and if no identification number is registered in the print permission list 315, it may be determined that the replacement of the printing apparatus is not performed.

If it is not to replace the printing apparatus (NO in step S1301), the installer 307 determines that the normal installation is to be executed and executes the processes of steps S1302 to S1309. The processes of S1302 to S1309 are same as the processes of steps S601 to S605 and S608 to S610 shown in FIG. 6, and therefore the description thereof is omitted.

On the other hand, in the case of replacing the printing apparatus (YES in step S1301), the installer 307 advances the process to step S1310. In step S1310, the installer 307 searches for an installable printing apparatus.

Next, in step S1311, the installer 307 presents a list of printing apparatuses not registered in the print permission list 315 to the user based on the information of the searched printing apparatuses (for example, model names of the printing apparatuses). For example, the model name of the searched printing apparatus is compared with the name of the printing apparatus registered together with the identification information in the print permission list 315 as shown in the item 702 of FIG. 7B, and the list of the unregistered printing apparatuses is presented. In step S1312, the installer 307 receives a user's selection of a printing apparatus to be installed (replaced) from the list of printing apparatuses presented in step S1311.

In step S1313, the installer 307 presents a list of printing apparatuses registered in the print permission list 315 to the user. In step S1314, the installer 307 receives user selection of printing apparatuses to be deleted from the print permission list 315 via the list of printing apparatuses presented in step S1313.

In step S1315, if the printer driver associated with the printing apparatus selected as the printing apparatus to be deleted in step S1314 is no longer necessary, the installer 307 uninstalls the unnecessary printer driver.

In step S1316, the installer 307 deletes the identification information of the printing apparatus selected in step S1314 from the print permission list 315. Then, the installer 307 executes the processes of steps S1305 to S1309 for replacing the printing apparatus selected in step S1312, and ends the update installation process.

For example, in the network 100a as shown in FIG. 1A, a case where the printing apparatus 1 (102) registered in the processing of FIG. 6 of the first embodiment or the processing of FIG. 11 of the second embodiment broke down will be considered. In this case, it is described that a printing apparatus 3 (104) and a printing apparatus 4 (105) are connected to the network 100a, and the broken printing apparatus 1 (102) is replace with the printing apparatus 3 (104) as shown in FIG. 1C.

Figure 7D:
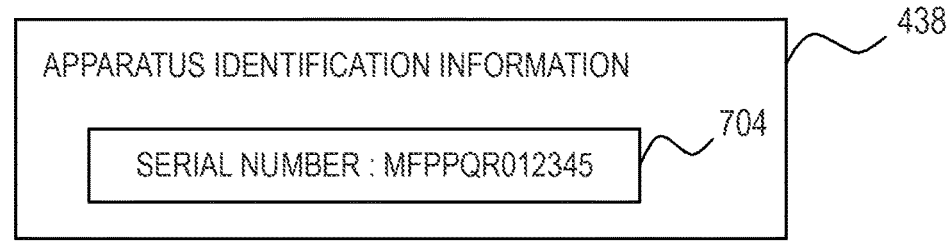
FIG. 7D illustrates apparatus identification information stored in the printer apparatus and the print permission list stored in the host computer.

The printing apparatus 3 (104) has apparatus identification information 438 that is same as the apparatus identification information 418 of the printing apparatus 1 (102), and has the serial number "MFPPQR012345" (704) as shown in FIG. 7D. Then, it is considered that the replacement of the printing apparatus is selected by the user instruction via the UI (not shown) when the installer 307 is started. In this case, in the search at step S1310 in FIG. 12, the printing apparatus 1 (102), the printing apparatus 3 (104), and the printing apparatus 4 (105) are found as installable printing apparatuses. In step S1311, the unregistered printing apparatus 3 (104) and printing apparatus 4 (105) are displayed in the UI because the printing apparatus 1 (102) is already registered in the print permission list.

Then, it is considered that the user selects the printing apparatus 3 (104) as a replacement of the printing apparatus 1 (102) in step S1312. In step S1313, the printing apparatus 1 (102) is displayed because the identification information of the printing apparatus 1 is registered in the print permission list. It is further considered that the user selects the printing apparatus 1 (102), which is the broken printing apparatus, as the printing apparatus to be deleted from the print permission list in step S1314. In step S1315, the printer driver corresponding to the printing apparatus 1 (102) is once unnecessary and is to be uninstalled because the printer driver corresponding to the printing apparatus 1 (102) is not used elsewhere.

In step S1314, the printing apparatus 1 (102) is selected as the printing apparatus to be deleted from the print permission list. Therefore, in step S1316, the serial number "MFPXYZ012345" (702) of the printing apparatus 1 (102) registered as shown in FIG. 7B is deleted from the print permission list 315.

Figure 7E:
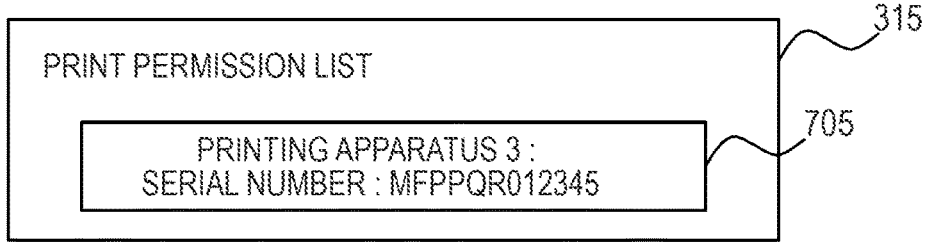
FIG. 7E illustrates apparatus identification information stored in the printer apparatus and the print permission list stored in the host computer.

Then, in steps S1305 to S1307, the driver corresponding to the printing apparatus 3 (104) is installed. In step S1308, the serial number "MFPPQR012345" (704) as shown in FIG. 7D is obtained as the identification information of the printing apparatus 3 (104). Further, in step S1309, the identification information obtained in step S1308 is registered in the print permission list 315 as the serial number "MFPPQR012345" (705) as shown in FIG. 7E, and the update installation process is completed.

With the replacement of the printing apparatus as described above, if a printing apparatus broke down in operation, it is possible to delete the broken printing apparatus from the print permission list, replace the broken printing apparatus, and register the newly installed printing apparatus. It is possible to achieve efficient operation of the printing apparatus in the company even if a printing apparatus breaks down, and it is also possible to prevent printing on the printing apparatus in a home or a shared office. As a result, even after the replacement of the printing apparatus, it is possible to prevent leakage of confidential information due to printing being performed outside the company via a PC taken outside the company.

As described above, in each embodiment, when the printer driver is installed in the PC, information (identification information) concerning the printing apparatus as the connection destination is registered in a print permission list (white list) of a storage area that can be written only if the user has the administrator authority of the OS. The installed printer driver outputs print data for the printing apparatus if information on the printing apparatus as the output destination of the print data is registered in the print permission list. On the other hand, if information on the printing apparatus is not registered in the print permission list, the printer driver does not output (cancel) the print data for the printing apparatus. With such a configuration, it is possible to permit printing on a target printing apparatus when the printer driver is installed, but not to permit printing on other printing apparatuses than the target printing apparatus. As a result, the PC of the company is permitted to perform printing only on the printing apparatus used in the company, and printing cannot be performed on printing apparatuses installed outside the company such as a home or a shared office. For example, even if a printing apparatus at a home or a shared office is connected via a USB interface and a printer queue is created by the Plug & Play function of USB, the present invention can prevent printing on the printing apparatus installed in the hole or shared office. Further, even if a user tries to use a printing apparatus installed in the home or the shared office connected via a USB interface through a printer driver installed by Point & Print is used, the present invention can prevent printing on the printing apparatus installed in the home or the shared office.

As described above, according to the present invention, printing on the target printing apparatus when the printer driver is installed is permitted, but printing on a printing apparatus other than the target printing apparatus using the installed printer driver can be prohibited. As a result, it is possible to prevent printing via a PC taken outside the company and to prevent leakage of confidential information due to printing outside the company.

In addition, for example, in the case of a Windows OS, it is possible to prohibit the installation of an IPPClass driver or the like by restricting the "add printer" function in the group policy. Thus, printing by using the IPPClass driver or the like can also be prevented. Further, since the administrator authority is not given to the general user, the general user cannot add the LPR by the function, and direct printing by the LPR command can also be prevented. In addition, restricting the function of installing a driver or the like by updating the OS in the group policy enables to prohibit the installation of an Inbox driver due to the update function of the OS. Thus, printing by using the Inbox driver or the like can also be prevented.

If the printer driver 308 of the present embodiment is uninstalled, information based on the identification information of the printing apparatus associated as the connection destination of the printer driver 308 to be uninstalled is deleted from the print permission list 315. This processing is performed, for example, by an uninstaller (unillustrated printer driver uninstallation program) of the printer driver 308.

The configuration and contents of the various data described above are not limited thereto, and the various configurations and contents are applicable according to the use and purpose. Although some embodiments have been described above, the present invention may be implemented, for example, as a system, apparatus, method, program, or storage medium. Specifically, the present invention may be applied to a system comprising a plurality of apparatuses, or may be applied to an apparatus comprising one apparatus. Further, all of the configurations in which the above embodiments are combined are also included in the present invention.

According to the present invention, it is possible to permit printing on a target printing apparatus when the printer driver is installed, but not to permit printing on a printing apparatus other than the target printing apparatus by using the installed printer driver. As a result, it is possible to prevent leakage of confidential information due to printing in external places via a PC taken outside the company.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-154459, filed Sep. 22, 2021, which is hereby incorporated by reference herein in its entirety.

What is claimed is:

1. An information processing apparatus comprising:
one or more processors;
one or more memories configured to store an install program for registering, in a case where a printer driver for a selected image forming apparatus is installed in the information processing apparatus with administrator authority, identification information of the image forming apparatus in a permission list, and not registering, in a case where the printer driver for the selected image forming apparatus is installed in the information processing apparatus without administrator authority, identification information of the image forming apparatus in the permission list; and
a controller configured to execute the printer driver to:
determine whether identification information of a target image forming apparatus installed in the information processing apparatus is also registered in the permission list;
cause the information processing apparatus to transmit print data generated by the printer driver to the target image forming apparatus, in a case where it is determined that the identification information of the target image forming apparatus installed in the information processing apparatus is also registered in the permission list; and
cause the information processing apparatus not to transmit the print data to the target image forming apparatus, in a case where it is determined that the identification information of the target image forming apparatus installed in the information processing apparatus is not registered in the permission list.

2. The information processing apparatus according to claim 1, wherein the permission list is able to be accessed by only a user having administrator authority.

3. The information processing apparatus according to claim 1, wherein the permission list is able to be edited by only a user having administrator authority.

4. The information processing apparatus according to claim 1, wherein the identification information is a serial number of the image forming apparatus.

5. The information processing apparatus according to claim 1, wherein the identification information of the image forming apparatus is a MAC address of the image forming apparatus.

6. The information processing apparatus according to claim 1, wherein the identification information of the image forming apparatus is an IP address of the image forming apparatus.

7. A control method for controlling an information processing apparatus including one or more memories configured to store an install program for registering, in a case where a printer driver for a selected image forming apparatus is installed in the information processing apparatus with administrator authority, identification information of the image forming apparatus in a permission list, and not registering, in a case where the printer driver for the selected image forming apparatus is installed in the information processing apparatus without administrator authority, identification information of the image forming apparatus in the permission list, the control method comprising:
determining whether identification information of a target image forming apparatus installed in the information processing apparatus is also registered in the permission list;
causing the information processing apparatus to transmit print data generated by the printer driver to the target image forming apparatus, in a case where it is determined that the identification information of the target image forming apparatus installed in the information processing apparatus is also registered in the permission list; and
causing the information processing apparatus not to transmit the print data to the target image forming apparatus, in a case where it is determined that the identification information of the target image forming apparatus installed in the information processing apparatus is not registered in the permission list.

8. The control method according to claim 7, wherein the permission list is able to be accessed by only a user having administrator authority.

9. The control method according to claim 7, wherein the permission list is able to be edited by only a user having administrator authority.

10. The control method according to claim 7, wherein the identification information is a serial number of the image forming apparatus.

11. The control method according to claim 7, wherein the identification information of the image forming apparatus is a MAC address of the image forming apparatus.

12. The control method according to claim 7, wherein the identification information of the image forming apparatus is an IP address of the image forming apparatus.

13. A non-transitory computer-readable storage medium storing program to cause a computer to perform a control method for controlling an information processing apparatus including one or more memories configured to store an install program for registering, in a case where a printer driver for a selected image forming apparatus is installed in the information processing apparatus with administrator authority, identification information of the image forming apparatus in a permission list, and not registering, in a case where the printer driver for the selected image forming apparatus is installed in the information processing apparatus without administrator authority, identification information of the image forming apparatus in the permission list, the control method comprising:

determining whether identification information of a target image forming apparatus installed in the information processing apparatus is also registered in the permission list;

causing the information processing apparatus to transmit print data generated by the printer driver to the target image forming apparatus, in a case where it is determined that the identification information of the target image forming apparatus installed in the information processing apparatus is also registered in the permission list; and causing the information processing apparatus not to transmit the print data to the target image forming apparatus, in a case where it is determined that the identification information of the target image forming apparatus installed in the information processing apparatus is not registered in the permission list.

* * * * *